United States Patent
Zaimi

[15] 3,682,495
[45] Aug. 8, 1972

[54] SNOW BIKE

[72] Inventor: Kourosh Zaimi, 1325 N. Dearborn Pkwy., Chicago, Ill. 60610

[22] Filed: Dec. 7, 1970

[21] Appl. No.: 95,837

Related U.S. Application Data

[63] Continuation-in-part of Ser. No. 812,545, March 12, 1969, abandoned, which is a continuation-in-part of Ser. No. 678,824, Oct. 30, 1967, abandoned.

[52] U.S. Cl.................280/12.14, 180/5 R, 280/16, 280/21
[51] Int. Cl. ............................................B62b 13/14
[58] Field of Search........280/10, 12, 12.1, 12.14, 21, 280/21.2, 21.1; 180/5

[56] References Cited

UNITED STATES PATENTS

| | | | |
|---|---|---|---|
| 3,140,099 | 7/1964 | Feu | 280/16 |
| 3,145,030 | 8/1964 | Millis | 280/16 |
| 3,178,196 | 4/1964 | Colace | 280/16 |
| 3,297,335 | 1/1967 | Ogata | 280/16 |
| 3,435,907 | 4/1969 | Imhoff | 180/5 |
| 2,589,764 | 3/1952 | Basso | 280/21 |

*Primary Examiner*—Benjamin Hersh
*Assistant Examiner*—Robert R. Song
*Attorney*—Mann, Brown, McWilliams & Bradway

[57] ABSTRACT

A winter sports vehicle including a pair of front support ski-like runners each separately manipulatable by the vehicle operator to provide a vehicle motion control that is comparable to that utilized by a skier. The vehicle is disclosed in gravity, motor, and operator powered forms.

22 Claims, 11 Drawing Figures

Inventor
Kourosh Zaimi
By Mann, Brown & McWilliams
Attys.

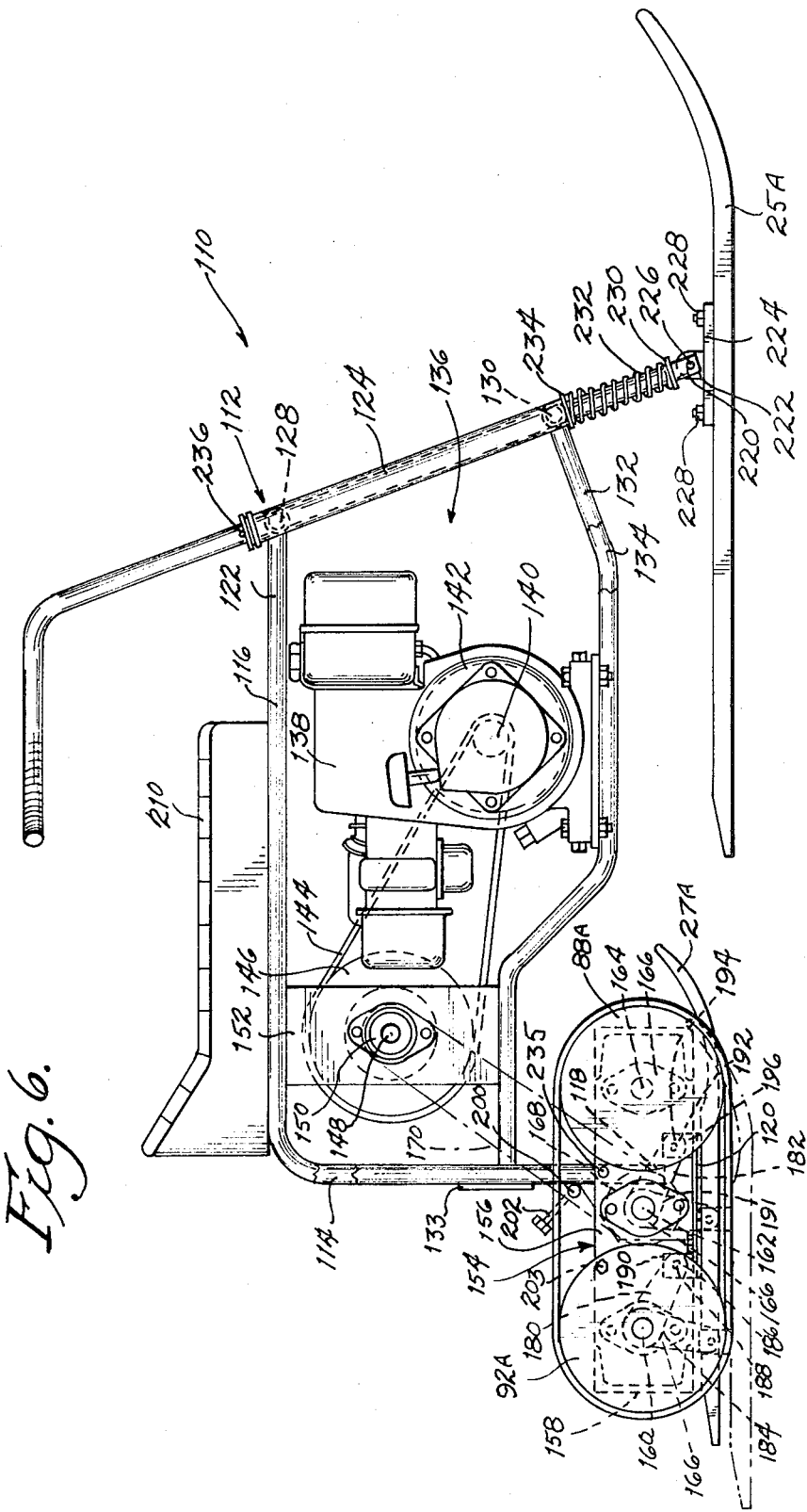

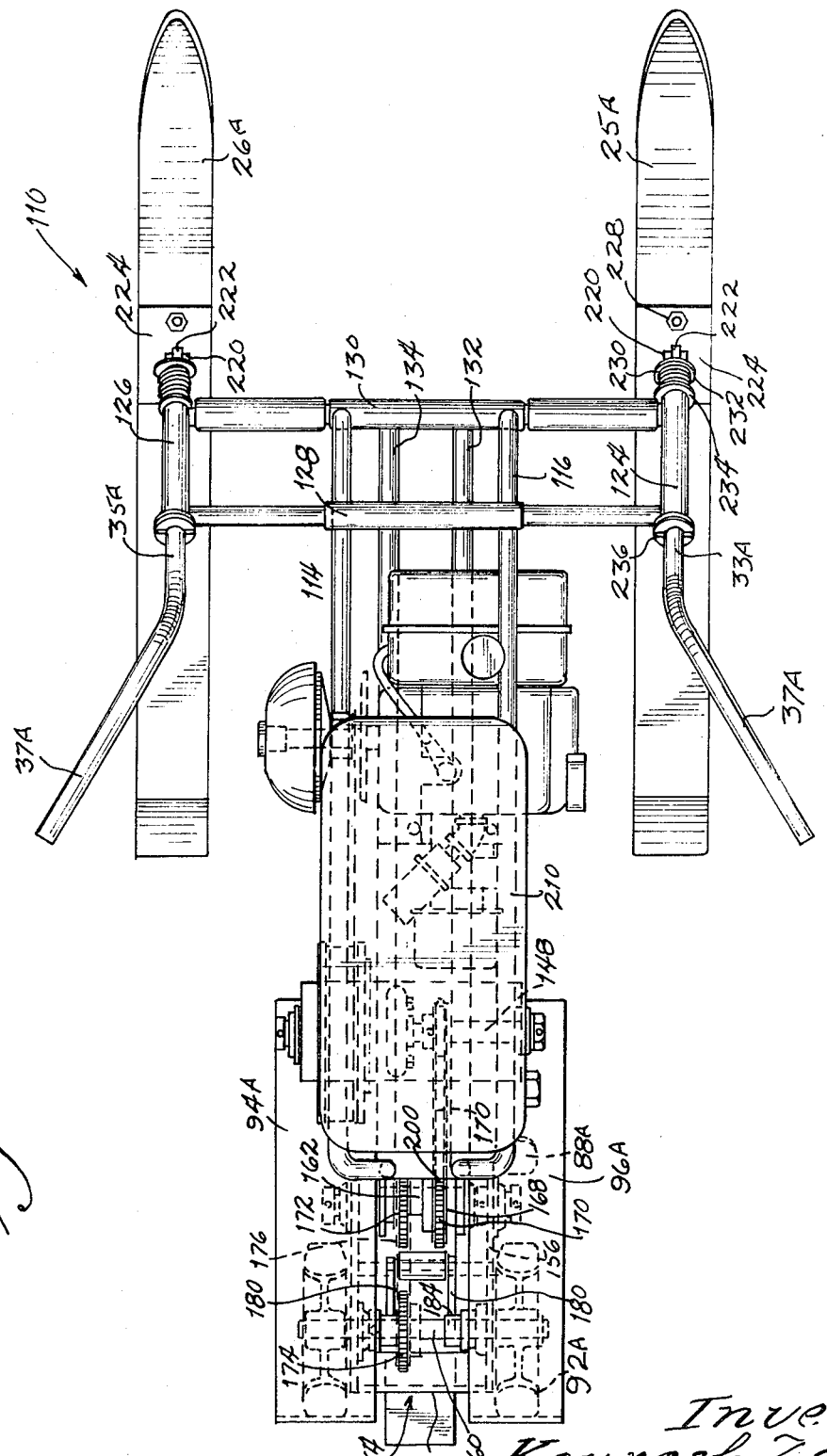

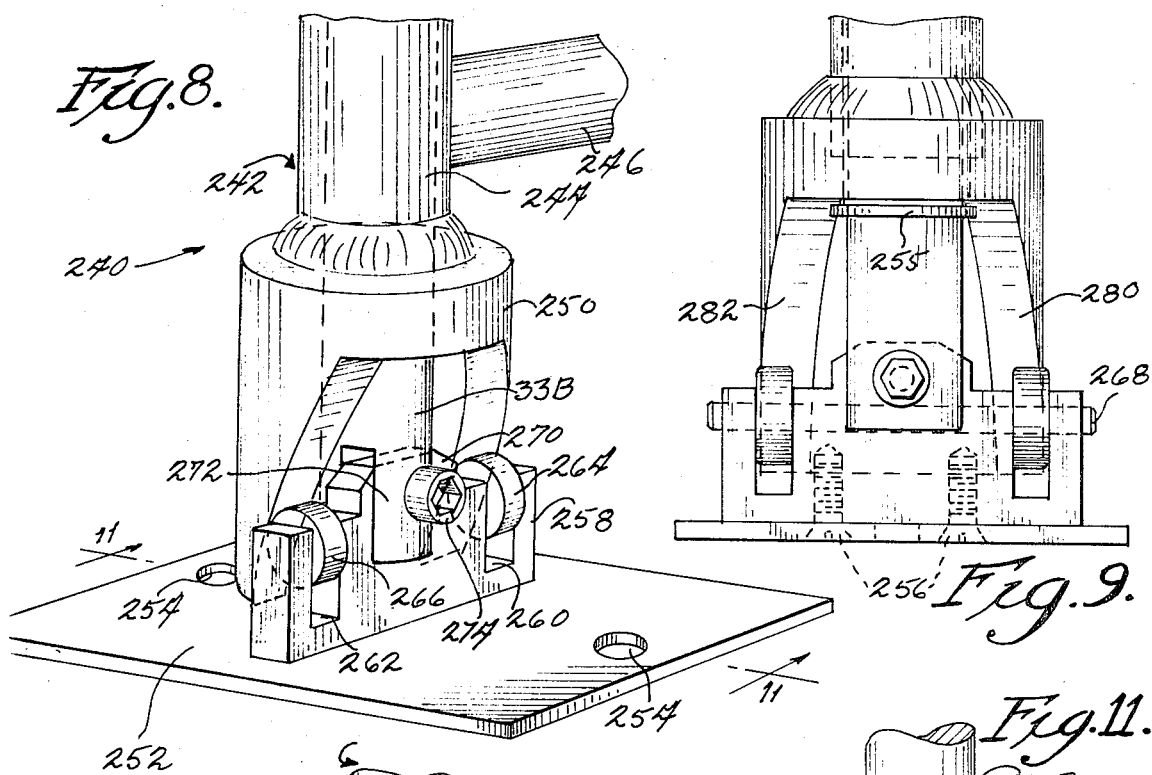

SNOW BIKE

This application is a continuation-in-part of my application Ser. No. 812,545, filed Mar. 12, 1969, now abandoned, which was a continuation-in-part of my abandoned application Ser. No. 678,824, filed Oct. 30, 1967.

This invention relates to a vehicle particularly adapted for use, although not exclusively, on snow or ice. More particularly, it relates to a type of winter sports vehicle which permits the rider to sit on the vehicle and yet steer as well as brake the same in a manner similar to the control that a skier has over his skies.

Outdoor winter sports, and particularly skiing, have enjoyed astronomical increases in popularity. Such sports are, however, not safe to participate in unless one has adequate agility or one is willing to assume a high degree of risk for the sake of outdoor pleasure.

It is an object of the present invention to provide a relatively safe device which is usable in snow, or on ice, in the same manner as skis, or in a manner similar to a snowmobile or the like, while permitting the user to sit down, as on a sled or snowmobile while maintaining complete control of the vehicle at all times.

It is another object of the invention to provide a vehicle of the type described which is easily and completely controlled both as to direction and in braking without causing undue stress on the body, thereby permitting its use in a sitting-down position and/or by any reasonably agile individual, all with a low risk of bodily harm incident to the pleasure derived.

It is still another object to provide a self-propelled, bicycle-like ski device for use, primarily, in snow or the like, the motion of which is controlled in a manner similar to the way a skier may control his motion.

These and other objects and advantages of the invention will become apparent from the following detailed description, taken in conjunction with the drawings, wherein like numerals of reference designate like elements throughout the drawings, and wherein:

FIG. 6 is a side elevational view of a motor powered embodiment of the invention which includes a simplified form of front runner control;

FIG. 7 is a plan view of the structure shown in FIG. 7;

FIG. 8 is a fragmental perspective view illustrating another front runner control arrangement in accordance with this invention;

FIG. 9 is an elevational view of the structure shown in FIG. 8, taken from the rear of a front runner;

FIG. 10 is a view similar to that of FIG. 8, showing the positioning of the front runner that is achieved by turning its control handle in the direction of the arrow; and FIG. 11 is a sectional view along line 11—11 of FIG. 8.

While the present invention is herein disclosed in detail with respect to what is now believed to be the preferred embodiments, it is to be understood that the disclosure of the invention in this manner is by way of illustration only, and that it is not intended that the invention be limited solely to the specific embodiment disclosed. On the contrary, the invention embodies all alternatives and equivalents falling within the spirit and scope of the appended claims.

Basically, the devices of this invention, in an exemplary embodiment, comprise a vehicle having at least two ski-like front runners disposed in parallel relationship secured to a bike-like frame having a seat and a pair of steering handles spaced with the runners being respectively mounted for independent pivotal movement about spaced vertical axes with respect to the frame and one another. The control for each runner includes means associated with the respective control handles so that the operator can position the runners in "ski snow" plow fashion for full control over movement of the vehicle. The result is that the vehicle front runners are separately positioned by the operator for the parallel full speed position, including steering, and braking, including steering while braking, may be achieved by operating the runners "snow plow" fashion, similar to the way a skier may "snow plow." In one embodiment there is a rear supporting means which can take the form of a single ski or, for that matter, a plurality of parallelly disposed skis or runners. In another embodiment, a tread means much like that found in principle on a snowmobile forms a bicycle-like self-propelled vehicle whereas in the earlier described embodiment, movement of the vehicle is obtained as from sliding down inclines and the like. In yet another embodiment, the vehicle is motor driven.

Figure 1:
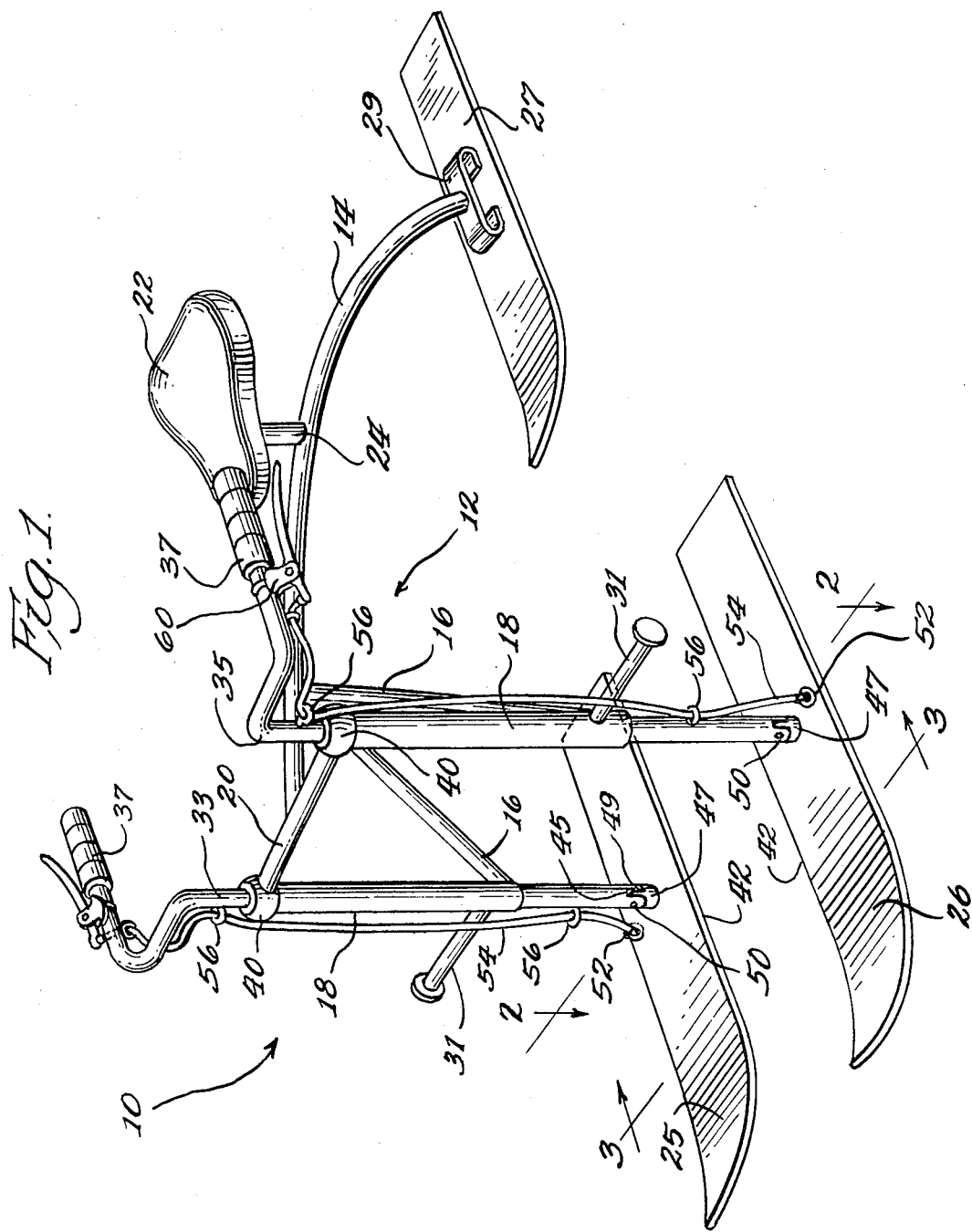
FIG. 1 is a perspective view of a gravity operated vehicle constructed in accordance with the present invention.

With reference now to the drawings, and specifically to FIG. 1, reference numeral 10 generally indicates a vehicle 10 constructed in accordance with the principles of the present invention. The vehicle 10 comprises a frame indicated generally at 12, the frame itself comprising a bowed main longitudinal member 14, which may be of tubular or other suitable construction, having tubular struts 16 extending therefrom in support of a pair of vertically disposed tubular members 18. The tubular members 18 are themselves joined by a cross member 20 to which the bowed member 14 attaches. In order that the user might sit on the vehicle, a seat 22 is positioned on a post 24 on the bowed member 14.

In order that the vehicle might be usable for snow, ice and possibly water, it is provided with a pair of forward or front runners or skis 25 and 26, and a rear runner or ski 27. The rear runner is attached to the bowed frame member 14 by means of a shock-absorbing U-shaped spring steel member 29. This member not only provides a rigid foundation for attachment of the rear runner, but is also of sufficient flexibility to be of shock absorbing character, thereby easing the otherwise hard riding character of the device. A pair of foot rests 31 having flanged ends extend outwardly from each of the posts 18 so that a person sitting on the seat 22 might have a seat well away from the trail, ice, etc., over which the device is being propelled.

In order, in accordance with the invention, that the rider might steer the vehicle as it is being propelled, either down a ski-covered slop, or over ice or water by towing or otherwise, the front runners 25 and 26 are so arranged as to be independently rotatable about parallel axes. To this end, the skis or runners 25 and 26 are secured to steering posts or bars 33 and 35, respectively. The posts 33 and 35 themselves have a slightly smaller outside diameter than the respective tubular members 18, and the posts respectively extend through the respective members 18 in bearing relation thereto to permit relative rotation or pivotal movement within the respective tubular members, while retaining a high degree of rigidity in other directions of stress. The steering posts 33 and 35 respectively terminate in handlebar portions 37, each of which is provided with a suitable hand grip of rubber or the like, as shown. Caps 40 at the top of the respective tubular members 18, each engage a shoulder or collar on the bars respectively 33 and 35, in order that the bars or posts will be retained at the proper height, and in order that the vehicle will not be subject to changes in height. The same effect might be accomplished by placing a collar about the lower portion of the posts to engage the bottom of the tubular members 18. In such a construction, a nylon or similar material bearing could be used in order to achieve substantially wear-free operation.

It will be now seen that the vehicle may be steered with the handlebars, by simply rotating the same to the left or right in order to move the vehicle in the direction desired, and that each front runner is moved independently of the other.

It is still another feature of the invention that a braking effect may be achieved without the rider dragging his feet, or by other less satisfactory means. Thus, in accordance with the present invention, the front runners 25 and 26 are each pivotable about a horizontal axis as well as being pivotal about vertical axes in the manner just described, and specifically, the front runners may be tilted snow plow fashion. Such an arrangement permits the front runners to be tipped so that the inside edge 42 of each of the skis 25 and 26 may be urged into the snow or other surface upon which the vehicle is riding, so that when the front skis are suitably brought out of parallelism snow plow fashion, the vehicle will be caused to be slowed down and eventually stopped, if desired.

In keeping with this aspect of the invention, in the embodiments of FIGS. 1-5 the lower portions of the respective posts 33 and 35 are slotted at 45, and a cylindrical shaft or stud 47, which is secured to the respective skis in any suitable manner, is pivotally mounted with respect to the respective posts. More specifically, each shaft or stud 47 is formed with a tongue 49, and the bifurcated ends of the respective posts 33 and 35, respectively, are each formed with an aperture through which a pivot pin 50 extends, with the pins 50 also extending through suitable holes formed in the respective tongues 49 as is apparent from the drawings. The axis of the respective pins is along the longitudinal axis of the respective skis themselves, and accordingly, the arrangement provides for a pivoting movement of the respective skis about this axis for each ski.

In order that the front skis might be manipulated manually from a convenient position for the user, eyelets 52 are screwed, or otherwise fastened, into the skis or runners 25 and 26, respectively, at a position outboard of the position at which the shafts or studs 47 are mounted. In the case of each ski, a cable 54 passes through the respective eyelets 56 that are secured to the respective posts and tubular members 18, and each cable 54 is connected with its own hand brake type actuating arrangement 60, which is recognizable as a typical Belden cable-type-bicycle brake. The hand brake of each handle bar is positioned next to the respective handle grips of handle bars 37, thereby permitting the user to tilt or tip the front runners or skis in the manner aforedescribed, by simply squeezing the respective brake arrangements 60 in the same manner as employed on many bicycles.

In use, the operator mounts seat 22 and grasps handle bars 37 in much the same manner one would mount a bike. The operator's feet are placed on foot rests 31 when movement, say downhill (in a forward direction) is desired, and by swinging handle bars 37 about their respective vertical axes, while keeping front runners 25 and 26 parallel, the vehicle 10 may be steered as desired. To slow or stop vehicle 10, the operator uses the fingers of his respective hands to grasp the respective handles of the respective brake arrangements 60 to independently tilt runners 25 and 26 in the manner shown in FIG. 3, while turning handle bars 37 outwardly of each other to dispose the runners 25 and 26 in the desired degree of "snow plow" relation, to control the vehicle movement much in the same manner as a skier would "snow plow."

Figure 4:
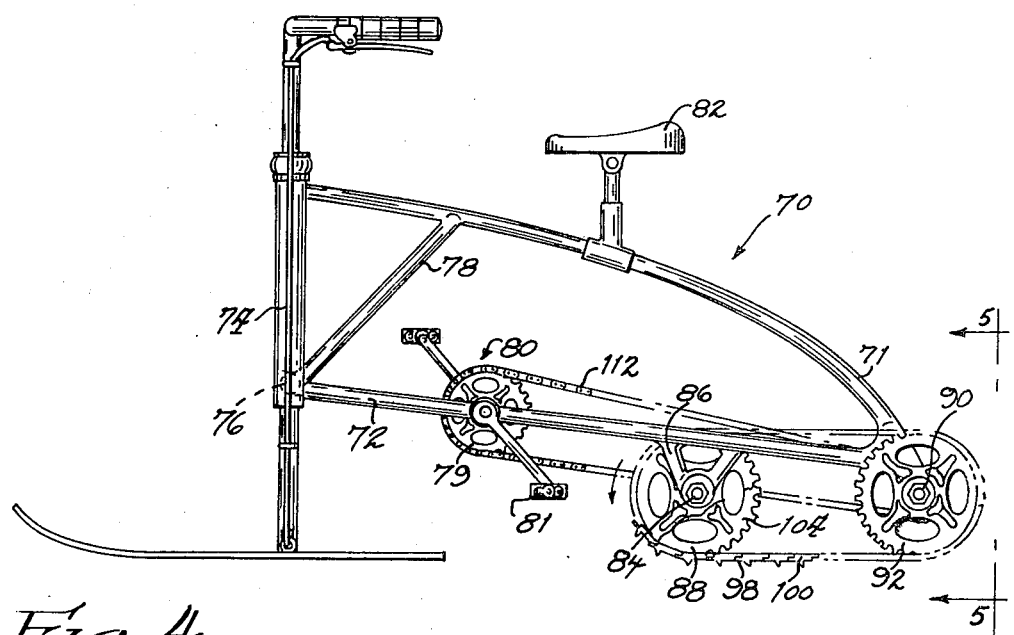
FIG. 4 is an elevational view of another embodiment of the invention of the operator power type.
Figure 5:
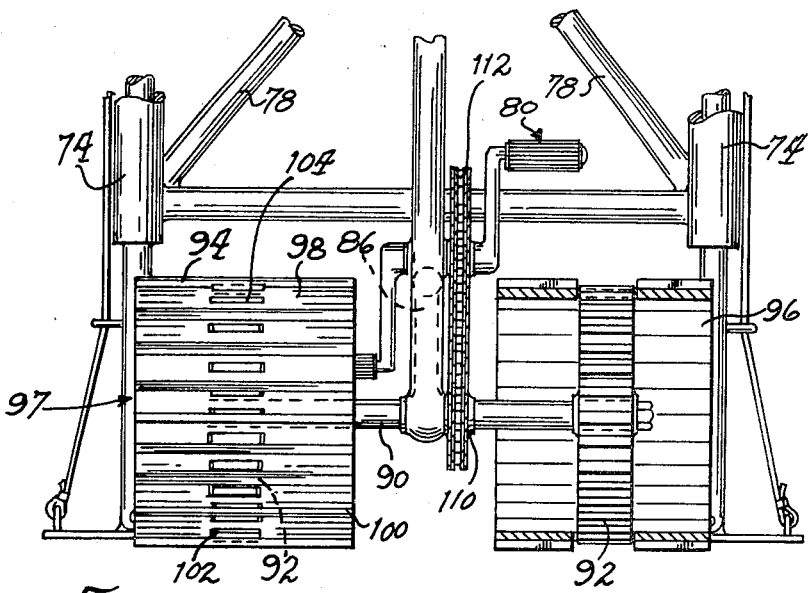
FIG. 5 is a partially fragmented view taken along the lines 5—5 of FIG. 4.

Referring now specifically to FIGS. 4 and 5, an operator powered bicycle-like or snowmobile-like device 70 is illustrated. While this embodiment illustrates a foot powered device, a motor powered unit is also contemplated (see FIGS. 6 and 7). The device 70 is, for the most part, similar to the device already described with the obvious differences in frame arrangement, the provision of power means here taking the form of pedals, gearing and rear tread-like members so as to provide a self-propelled vehicle. The specific vehicle 70 illustrated necessitates bottom tubular frame member 72 supported from upstanding tubular members 74 by appropriate cross member 76 and held in rigid relationship by reinforcing members 78. Member 72 is provided with the well-known bicycle pedal and sprocket assembly 80 properly aligned with seat 82 so that the operator of the device 70, when sitting on the seat 82, will be able to reach the pedals 81 of bicycle assemblage 80. Positioned rearwardly of the seat 82 is a first shaft 84 supported from member 72 by depending support member 86 with the shaft 84 being mounted in rotatable fashion. Secured to each end of the shaft 84 is a pair of spaced gears 88. Rearward of shaft 84, second shaft 90 is also rotatively supported from main bow frame member 71. Secured to each end of the shaft 90 are spaced gears 92 identical, in this instance, to the gears 88. The pairs of gears 88 and 92 are in aligned relationship with respect to one another and are of the type adapted to receive tread members such as 94 and 96. Tread member 94, for instance, is in the form of a continuous belt having flexible links 98 secured to one another in pivot-like fashion by pins (not shown). It will be noted that each of the links 98 have a depending, transverse lug projection 100 extending the width thereof. Appropriate receiving slots 102 provide means whereby the teeth 104 of, for instance, gear 88 may engage so as to cause the tread members to be carried around the spaced pairs of gears. It is obvious that the pivotal character of the links making up the tread members 94 and 96 makes it possible for each of the links to be carried through the path defined by the spaced pairs of gears 88 and 90.

While the disclosure is specific to two pairs of spaced gears forming the pathway around which the tread members travel, it is, of course, possible to have each of the arcuate sections of the pathway formed by pairs of spaced gears so as to provide better support for the links making up the tread members. Additionally, supporting gears may be provided for the linear sections of the tread members to insure proper operation.

Secured to shaft 90 is sprocket gear 110 operatively connected to main sprocket gear 79 of bicycle assemblage 80 by means of bicycle chain 112. Those familiar with the bicycle art will understand and appreciate that the foregoing description pertains to nothing more than a modified bicycle assembly. Thus, the operator sitting on the seat 82 will pump the pedals 81 to thereby turn the gear 79 to drive the sprocket gear 110 secured to shaft 90. Obviously, shafts 90 and 84 are provided with suitable bearings and the like so as to achieve the desired ends. Upon operation, gears 92 become the driving means of the tread members 94 and 96 to thereby cause movement of the individual links making up the tread members around the pathway defined by the spaced pairs of gears 88 and 92. The movement of direction may be in direction of the arrow of FIG. 4, or opposite thereto, depending upon movement of the pedals 81.

The transverse width of the individual links 98 making up tread members 94 and 96, may be varied but should be of such width as to be capable of supporting the vehicle 70 and a passenger on the surface of snow or at least preventing the vehicle from sinking down into the snow a substantial distance. Additional gear or other members to insure contact between tread members and supporting surface may be desirable. In other words, the greater contact area of the tread members with a supporting surface, the lesser the sinking distance of the vehicle bearing the passenger. The same principle as used in snowshoes applies here also, i.e., distribution of weight over as great an area as possible. The individual links 98 of the tread members may be fabricated of rubber or plastic, appropriate care, where necessary, being taken to reinforce the slots 102 for engagement with the gears 88 and 92. Likewise, the gears 88 and 92 may be made of metal, durable plastic, and like materials. These are all matters to which no claim is laid and of which those of ordinary skill in the art will be totally familiar.

The operation of the braking portion of the apparatus is identical to that heretofore disclosed and in the operator powered self-propelled embodiment 70 of the invention, it is, of course, obvious that the utility of the device is extended. That is, where the device illustrated in FIG. 1 is used in sliding fashion on hills, inclines and the like, the device of FIG. 4 may be used on flat or level surfaces or, for that matter, can be used in going up and down hills.

In FIGS. 6 and 7 there is illustrated a motor driven embodiment 110 of the invention, which comprises a vehicle frame 112 including a pair of L shaped frame members 114 and 116 having their lower ends 118 suitably releasably fixed to a mounting plate structure 120 (as by employing attachment bolts or the like), with their other ends 122 being respectively fixed to the respective tubular members 124 and 126 of the frame. The tubular members 124 and 126 correspond to tubular members 18 of vehicle 10 and are joined together by upper and lower brace members 128 and 130, and a pair of motor support members 132 and 134 extend from the lower brace member 130 to the downwardly extending portions of the frame members 114 and 116, respectively. Frame members 114 and 116 are suitably connected at the rear of vehicle 110 by reinforcing plate 133. These parts are suitably joined together, as by welding.

Suitably mounted on the bars 132 and 134 is the motor drive that is generally indicated by reference numeral 136, and while this may be of any suitable type, that shown generally comprises suitable internal combustion engine 138 driving suitable sprocket 140 through a suitable transmission 42. Drive chain 144 connects sprocket 140 to sprocket 146 which is keyed to suitable shaft 148 journaled in suitable bearings 150 operatively mounted in bracket plates 152 that are fixed between the respective bars 116 and 132 and 114 and 134.

Received about the lower ends 118 of the respective bars 114 and 116 is a suitable frame structure 154 comprising in the form shown spaced side members 156 and end members 158 joined in any suitable manner, as by welding, to define the frame structure 154 (which is generally rectangular in configuration). Frame structure 154 has journaled therein between its side members 156 and in spaced parallel relation three shafts 160, 162 and 164, these shafts being journaled in place by employing suitable bearing units 166 or the like.

The intermediate or middle shaft 166 has keyed thereto a suitable sprocket 168 which is driven by drive chain 170 that is in turn driven by the sprocket 150 that has already been described. Also keyed to the shaft 162 is sprocket 172 which transmits drive to shaft 160 through the sprocket 174 that is keyed thereto, by way of drive chain 176 which is suitably trained over sprockets 172 and 174. The shafts 160 and 164 have respectively keyed thereto spaced pairs of gears 88A and 92A that are similar to the spaced gear pairs 88 and 92 of vehicle 70, respectively, and that have trained over same tread members 94A and 96A that are similar to tread members 94 and 96 (the tread members 94A and 96A being shown in block diagram form only).

In the specific arrangement shown in FIGS. 6 and 7, the frame structure 154 is arranged to be moved between raised and lowered positions so that the tread members 94A and 96A may be selectively positioned between operative and inoperative relation with respect to the snow or the like on which the vehicle 110 is used. For this purpose, the shafts 160 and 162 are swingably connected to the plate structure 120 by the respective pairs of parallel links 180 and 182; in the case of the pairs of links 180, their ends 184 are suitably journaled on the shaft 160, while their ends 186 are pivotally connected as at 188 to suitable upstanding lugs 190 affixed to the bracket structure 120. In the case of the links 182, the ends 191 thereof are suitably journaled on shaft 162, while their other ends 192 are pivoted as at 194 to suitable upstanding lugs 196 affixed to the plate structure 120.

Fixed between the bars 114 and 116 of frame 112 is a cross bar 200 having suitably applied thereto a support stud 202 which in the form shown is a bolt that may be threadedly received in cross bar 200 for ease of removal and application.

Plate structure 120 has suitably fixed to its undersurface a rear ski or runner 27A.

When it is desired to use the drive 136 to motivate vehicle 110, the frame structure 154 is positioned as shown. The pivotal structure forming pivots 188 and 192 is preferably of the locking type so that the swing levers 180 and 182 may be locked in the positions of FIG. 6, and for this purpose they may comprise suitable nut and bolt arrangements for clamping the respective swing levers 180 and 182 in fixed relation with respect to the respective mounting plates 190 and 196. In this position, the lower runs of the treads 94A and 96A are disposed below the rear runner or ski 27A for application of driving traction to the snow or the like.

If the drive 136 is inoperative or it is desired to use the vehicle as a gravity powered vehicle only (as for instance, going downhill), the clamping means comprising the pivots 188 and 194 are loosened, and the bolt 202 removed so that the swing levers 180 and 182 can be swung clockwise about the respective pivots 188 and 194 so that the bolt 202 may be positioned behind a cross rod 203 of the frame 154 to hold the framework 54 in an elevated position that will dispose the lower runs of treads 94A and 96A above the level of rear runner or ski 27A.

Vehicle 110 includes seat 210 of the familiar snowmobile type suitably affixed to frame members 114 and 116. The tubular frame members 124 and 126 each have applied thereto a steering post 33A and 35A, respectively, which are comparable to steering posts 33 and 35 and are thus journaled in the respective tubular members 124 and 126 for pivotal movement about their respective longitudinal axes. Steering posts 33A and 35A each include a handlebar portion 37A (which may be suitably equipped with a suitable hand grip [not shown]), with the respective steering posts 33A and 35A each having a bifurcated lower end 220 receiving a lug 222 of a mounting plate 224, with the respective mounting plates 224 being suitably affixed to the respective forward runners or skis 25A and 26A.

In the form shown in FIGS. 6 and 7, pivot pins 226 extending transversely of the respective forward runners or skis pivotally mount the ends 220 of the respective steering posts 33A and 35A on the respective lugs 222 of the respective mounting plates 224. Mounting plates 224 are secured in place by suitable bolts 228.

Each post 33A and 35A has affixed thereto adjacent its end 220 a suitable spring seat 230 on which is seated compression spring 232 which bears against spring seat 234 that is slidably received on the respective posts 33A and 35A, and which bears against the lower ends of the respective tubular members 124 and 126 to serve as a spring support and shock absorber for the forward part of the frame 112 with respect to the forward runners or skis 25A and 26A. The respective steering posts 33A and 35A each include a cross pin 236 that serve as stops for limiting the amount of movement that the tubular members 124 may have upwardly of the respective steering posts 33A and 35A.

The steering posts 33A and 35A are thus pivotally mounted within the frame tubular members 124 and 126, respectively, to provide the independent steering movement of the forward runners or skis that has been heretofore described. The particular pivotal connection of the steering posts 33A and 35A with the respective front runners or skis also permits the hereinbefore described snow plow action to slow or stop the vehicle, this being accomplished by the operator moving the handle portions 37A of the steering posts 33A and 35A away from each other, which tends to cause the skis 25A and 26A to turn upwardly on their inner sides and dig into the snow surface or the like. This same operating action on the steering posts will also tend to bring the front ends of the forward runners or skis toward each other, thus providing the desired "snow plow" skiing action which is entirely under the control of the operator through manipulation of handle portions 37A of the respective steering posts.

It is also contemplated that the frame structure 154 may be the fixed component of the frame rear support, and that the rear ski or runner 27A may be the movable component. In this case, the frame 154 is made suitably fixed with respect to frame members 114 and 116 in the full line position that is illustrated in FIG. 6, as by removing rod 203 and applying it to aligned holes 235 formed in the frame side members 156 when said holes have been aligned with similar holes (not shown) formed in frame members 114 and 116. After plate structure 120 has been disconnected from frame members 114 and 116, pivots 188 and 194 may be unlocked and relocked after the ski 27A has been moved between the full line position of FIG. 6, wherein tread members 94A and 96A are disposed for driving traction with the snow and the like, and the dashed line position of FIG. 6, wherein the rear ski or runner supports the tread members above any substantial contact with the snow or other surface. The parts involved may be returned to the full line position of FIG. 6 by reversing the procedure just indicated. Ski 27A may be so actuated by providing a suitable lever actuated positioning arrangement, if so desired.

FIGS. 8–11 illustrate another embodiment 240 of the invention in which the vehicle frame 242 may be of one of the types shown in FIGS. 1–6, but having the special pivotal connection with the front runners or skis that is shown in FIGS. 8–11.

Frame 242 comprises the spaced tubular members 244 (though only one is shown) that receive the respective steering posts, with only the steering post 33B being shown, it being understood that the other steering post of the vehicle and associated structures are comparable arranged. Tubular members 244 of the respective steering posts are joined together by suitable connecting bars 246, such as have been previously described.

The tubular members 244 each have fixed thereto as by welding at 245 a sleeve member 250 through which the steering post 33B extends for connection to ski mounting plate 252, which in the form shown includes spaced holes 254 for application to the front runners or skis by bolts or screws comparable to the manner shown in FIG. 6 with regard to the front skis or runners 25A and 26A. Locking ring 255 applied to groove 257 of the post 33B and engaged by annular wall 259 of sleeve 250 limits possible downward movement of the tubular member 244 relative to post 33B.

Affixed to the mounting plate 252 by suitable screws 256 is a plate member 258 that is slotted as at 260 and 262 to receive the respective rollers 264 and 266 which are journaled in place by a suitable cross pin 268 that extends lengthwise of the plate 258 and through the respective rollers 264 and 266.

The plate 258 includes an upwardly projecting lug 270 over which the bifurcated end 272 of the steering post 33B is received, the steering post 33B being pivotally secured to the plate 258 by suitable cap screw 274. Thus, the pivotal connection of the steering post 33B to mounting plate 252 defines a pivot axis that extends longitudinally of the ski to which mounting plate 252 is to be secured.

The sleeve 250 is suitably excised to define planar cam surfaces 280 and 282 which, in the assembled relation of the structure shown in FIGS. 8–11, are respectively engaged by the respective rollers 264 and 266.

In operation, assuming that the steering post 33B and its cooperating steering post are applied to frame 222 in a manner comparable to the showings of FIGS. 1–7, and that the respective mounting plates 252 are secured to respective front runners or skis in a manner comparable to that shown in FIGS. 6 and 7, the vehicle 240 can be steered by the operator maneuvering the steering posts so as to maintain the forward runners or skis in parallelism while turning them to the right or to the left as desired to steer the vehicle. Assuming only plain steering movement of the forward skis or runners is desired, pivotal movement of the steering posts about their longitudinal axis is then insufficient to cause the rollers 264 and 266 to significantly depart from their relative positions of FIGS. 8, 9 and 11 with respect to surfaces 280 and 282 of the sleeve 250.

However, swinging movement of the steering posts that is to be sufficient to cause the desired snow plow action will cause sufficient relative movement between the respective steering posts and lugs 250 of mounting plates 252 such that the mounting plates 252 and rollers 264 and 266 will approach the relative positions with respect to surfaces 280 and 282 of sleeve 250 that are indicated in FIG. 10, to achieve the desired downward tilting of the inner sides of the skis as well as the bringing of the ski tips toward each other, that forms a part of a skier's snow plow skiing action. Returning of the steering posts to normal steering position returns the skis to substantial parallelism and flatness relative to the surface of the snow or the like.

Figure 2:
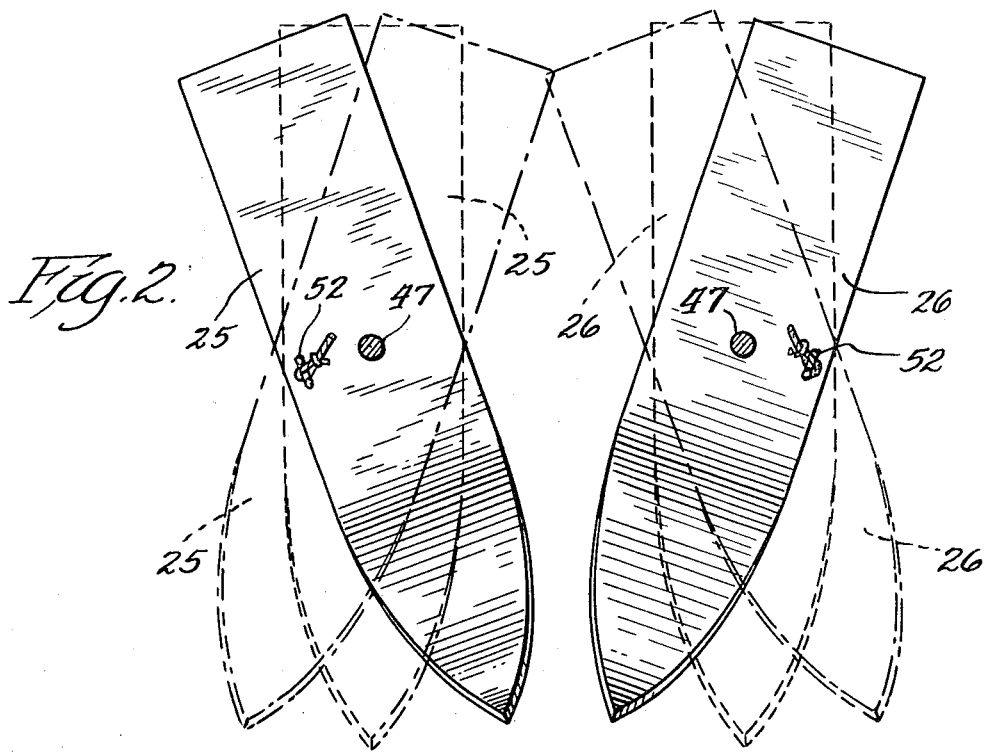
FIG. 2 is a sectional view of the forward runner portions of the vehicle taken along line 2—2 of FIG. 1, and illustrating the degree of mobility of the vehicle front runners or skis that is achieved by the vehicle construction of the present invention.
Figure 3:
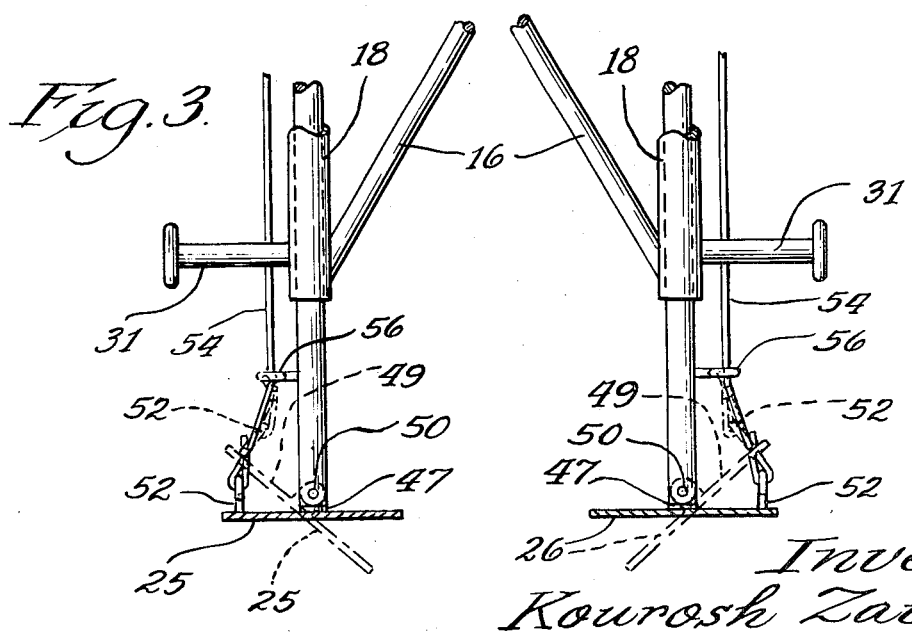
FIG. 3 is a side elevation, partially fragmented, taken along line 3—3 of FIG. 1, of a portion of the vehicle frame and braking mechanism.

While the specific arrangements depicted illustrate a pair of spaced forward runners or skis, it is obvious that in each of the embodiments depicted, the spaced runners may be positioned rearwardly with suitable modification to the support structure, and the steering posts need not be vertically disposed, as such, a substantial upright position will be satisfactory (see FIG. 6). In the self and motor propelled embodiments, the propulsion component may be positioned forward of the seat instead of rearward; towing of all the vehicle forms illustrated, in lieu of motor or other type of self propelling, is also contemplated. In the form of FIGS. 1–3, while individual cables have been illustrated to cause the braking action heretofore described, a single cable and handle bar actuating member will, at times, be desirable. Also the relative sizes of the sprocket gear and tread member gears may be reversed in the illustrated foot-powered embodiment in order to achieve a mechanical advantage, and a pair of stabilizing skis may be employed at the rear of the vehicle instead of one.

The adaptability of the present invention to different uses is a significant feature. In addition to those mentioned heretofore, large diameter rubber wheels may be employed in the embodiments of FIGS. 4–7 in place of the endless treads illustrated for use in riding on sand (for instance, sand dunes). Likewise, pontoons may be employed in place of the said endless treads for riding on water. For ice, ice skating type blades may be substituted for the ski type runners illustrated.

Where it is desired to not use the "snow plow" approach for braking that is preferred in accordance with this invention, the arrangements for tilting the front runners hereindisclosed may be dispensed with and instead some other braking arrangement employed. For instance, to achieve this end, the cables 54 and hand brake arrangements 60 of vehicle 10 may be omitted, and the vehicle provided instead with a suitable drag brake arrangement. This still retains the novel independent steering of the two front runners that comprises a principal feature of this invention. Also, other suitable braking arrangements may be employed; for instance, in the operator powered and motor driven forms, the tread members when not driven will serve to brake down hill movement, or if desired, the treads may be driven in reverse to accentuate the braking action.

It will be appreciated that the present invention provides a skiing type vehicle which is readily controlled from a seat, while being usable on rough terrains covered with snow, as well as being usable on ice, sand, and also water when suitably adapted for water use.

I claim:

1. A vehicle primarily for use on snow or ice having an elongated frame, a set of forward runners and a rear runner supporting frame, a vertical post connected to each of said forward runners, said posts being mounted on said frame for rotation on a vertical axis with respect thereto, a cable attached to each said forward runner in parallel alignment with and outboard of its mounting said post, said posts being constructed to permit pivoting of said runners about a horizontal axis, said posts terminating in handlebars to permit steering of the vehicle, and means for manipulating said cables to tip said runners to act as a brake therefor.

2. The vehicle in accordance with claim 1 wherein means for supporting a rider is intermediately mounted on said elongated frame.

3. The vehicle in accordance with claim 2 wherein outwardly extending footrest means are positioned intermediate each of said vertical posts and adapted to act as supports for the feet of a rider of said vehicle.

4. The vehicle in accordance with claim 2 wherein a spring member is positioned intermediate said elongated frame and said rear runner whereby shock absorptive mounting is obtained.

5. The vehicle in accordance with claim 4 wherein said forward runners have means secured thereto through which said cables are connected, and each of said cables is secured intermediate its ends to each of said vertical posts.

6. The vehicle in accordance with claim 5 wherein said means for manipulating said cables comprises hand operable levers secured to said handlebars.

7. The vehicle in accordance with claim 6 wherein the means for supporting a rider comprises a seat.

8. The vehicle in accordance with claim 7 wherein said outwardly extending footrest means have enlarged flanges on the ends thereof to prohibit sliding of the rider's feet therefrom, and enable the rider of the vehicle to exert forces thereon while said forward runners are being tipped to effectively slow said vehicle.

9. The vehicle in accordance with claim 8 wherein each of said posts is mounted in a vertically disposed tubular member and a cross bar is secured between and connects each of said tubular members.

10. The vehicle in accordance with claim 9 wherein a brace bar is secured between said elongated frame and each of said vertically disposed tubular members.

11. A vehicle having an elongated frame, a set of forward runners and a rear supporting means, a vertical post connected to each of said forward runners, said posts being mounted on said frame for rotation on a vertical axis with respect thereto, a cable attached to each said forward runner in parallel alignment with and outboard of its mounting said post, said posts being constructed to permit pivoting of said runners about a horizontal axis, said posts terminating in handlebars to permit steering of the vehicle, and means for manipulating said cables to tip said runners to act as a brake therefor.

12. The vehicle in accordance with claim 11 wherein said rear supporting means includes a runner supported from said elongated frame.

13. A vehicle having at least two runners disposed in parallel relationship supported from an elongated frame having a seat and a pair of independent steering handles each connected to one of said runners spaced therefrom, each of said runners being mounted for pivotal rotation on an upright axis and a longitudinal axis with respect to said frame and towards one another, means cooperating with each of said handles to tip said runners to act as a brake for said vehicle, and a third point contact for stability.

14. The vehicle in accordance with claim 13 wherein said at least two runners are positioned forward of said seat.

15. The vehicle in accordance with claim 14 wherein a third runner is positioned rearward of said seat.

16. The vehicle in accordance with claim 14 wherein said third point contact for stability comprises a pair of powered tractor-like tread members positioned rearward of said seat.

17. The vehicle in accordance with claim 16 wherein said tread members are foot-powered and a sprocket gear member having pedals oppositely secured thereon is secured to said frame in operative relationship below said seat.

18. The vehicle in accordance with claim 17 wherein said pair of foot-powered tractor-like tread members comprises a pair of spaced apart wheel gear members mounted on a first rotatively supported shaft, a like pair of spaced-apart wheel gear members are mounted on a second rotatively supported shaft spaced from said first shaft, said first and second shafts being supported from said elongated frame.

19. The vehicle in accordance with claim 18 wherein spaced tread members encircle spaced and aligned gear members of said first and second shafts in operative fashion whereby the rotation of said gears causes said tread members to follow the path defined by said spaced and aligned gear members.

20. The vehicle in accordance with claim 19 wherein said treads are of a width sufficient to support said vehicle in snow and said second shaft has secured thereto a driving gear operatively connected to said sprocket gear by a chain means.

21. A vehicle comprising:
a frame having a seat,
a pair of front runners adjacent the forward end of the frame for supporting the front end of the frame,
each of said runners being mounted on the vehicle for side to side swinging movement independent of each other to steer the vehicle,
each of said runners having its own steering handle secured thereto,
said handles being respectively mounted on said frame for pivotal movement with respect thereto to swing the respective runners to steer the vehicle,
means for braking said vehicle,
and means for supporting the rear end of said frame.

22. The vehicle set forth in claim 21 wherein:
said braking means comprises means cooperating with the respective runner handles for tipping said runners to act as a brake for said vehicle.

* * * * *